April 26, 1960   J. W. FARMER ET AL   2,934,132
LEG REST
Filed Nov. 15, 1957
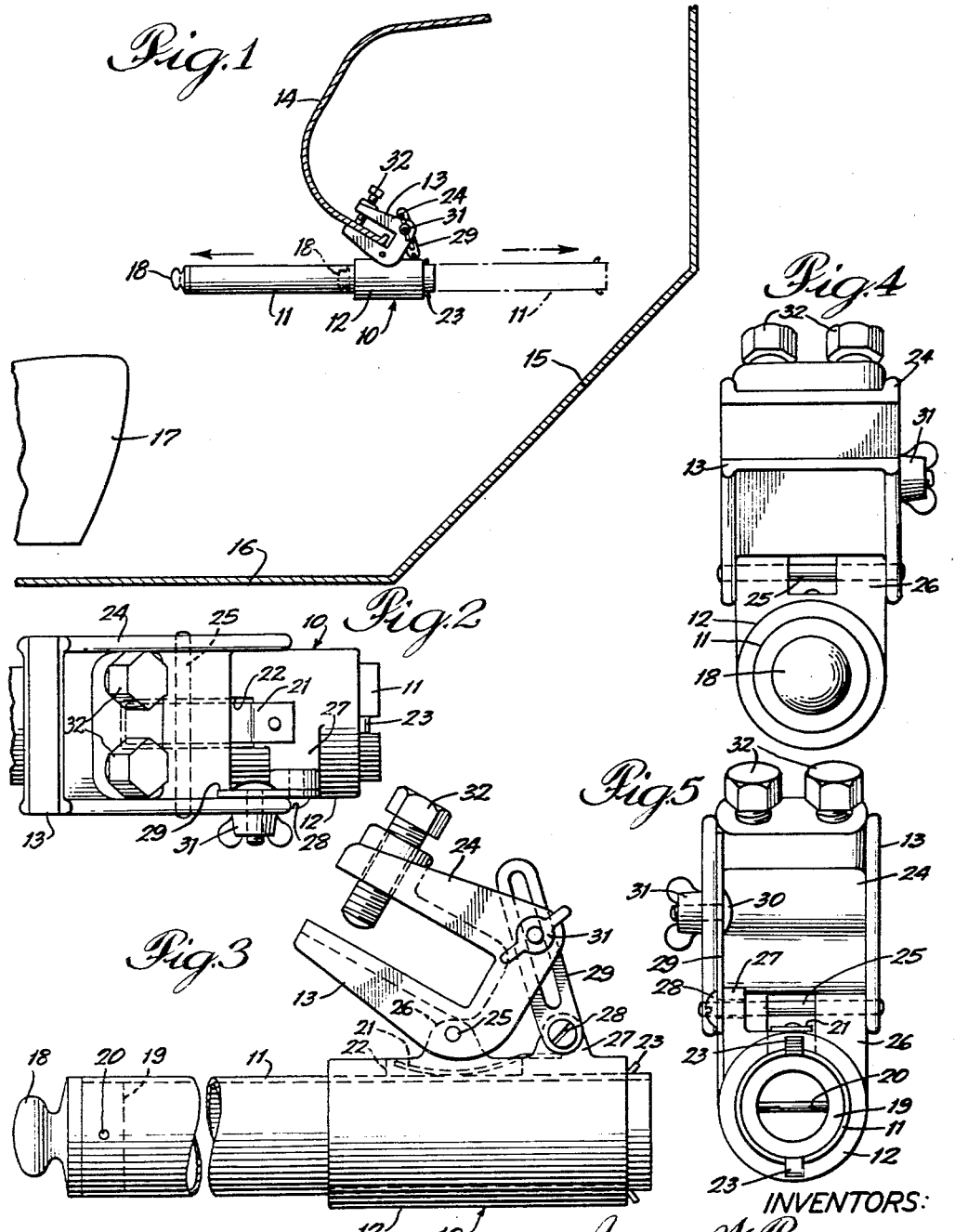
INVENTORS:
James W. Farmer
and Harold P. Ryder,
BY Dawson, Tilton, Fallon & Lungmus,
ATTORNEYS.

United States Patent Office 2,934,132
Patented Apr. 26, 1960

2,934,132

LEG REST

James W. Farmer, Danvers, Mass., and Harold F. Ryder, Wheaton, Ill.

Application November 15, 1957, Serial No. 696,745

8 Claims. (Cl. 155—165)

This invention relates to a leg rest and more specifically to an improved leg support particularly suitable for use in automobiles or other motor vehicles for reducing driver fatigue.

It has been found that tension and strain of the leg muscles after prolonged operation of an automobile accelerator pedal results largely from the fact that the lower part of the right leg used for operating that pedal must be continuously held in an upright position. This is particularly true in the operation of modern automobiles where the force necessary to depress the pedal is relatively slight and approximates the force normally imposed by the weight of a driver's foot resting thereagainst. Muscle fatigue not only causes discomfort and distraction, but also affects the driver's ability to respond quickly in emergency situations. Furthermore, such fatigue is likely to lead to dangerous driving practices in an effort to relieve tension of the leg muscles, such as temporarily manipulating the accelerator pedal with the left foot while relaxing the right leg in a changed position. Obviously, the awkward position which a driver must necessarily assume during the temporary change, as well as the substantial deviation from the usual driving practice, have adverse effects upon the driver's ability to maintain proper control of his vehicle.

In the past, a number of leg rests have been developed for use in automobiles but these devices have all been unsatisfactory or commercially unacceptable for various reasons. For one thing, previous structures have generally been difficult to mount and have not been readily adaptable for use in connection with vehicles of different make or design. Their cumbersome construction not only tended to impair the comfort of front-seat passengers but also provided dangerous instruments of potential injury in the event of an accident or collision. Devices of a retractable type had the common disadvantage of requiring considerable attention and bodily movement for their extension and retraction with the result that a driver could position such a rest during vehicle operation only at the expense of his safety and that of his passengers.

Accordingly, one of the principal objects of the present invention is to provide a retractable leg rest for use in automobiles and other motor vehicles which overcomes the aforementioned defects and disadvantages of prior structures. Another object is to provide a retractable leg rest which may be easily and inexpensively manufactured and which may be quickly installed for use in automobiles of different make and style. A further object of the present invention is to provide a leg rest for use in automobiles which may be easily and quickly retracted or extended by a driver even while the automobile is in motion. A still further object is to provide a retractable support for the right leg of an automobile operator which, because of its compact and retractable construction, provides greater safety for the driver and passengers in a collision or during sudden stops.

Other objects will appear from the specification and drawings in which:

Figure 1 is a side elevation of a leg rest embodying the present invention, the view also showing parts of an automobile in section to illustrate the rest in mounted condition.

Figure 2 is a broken top plan view of the leg rest showing details of the connecting means therefor.

Figure 3 is a broken side elevation of the leg rest in extended condition.

Figure 4 is an elevational view showing the leg rest as viewed from the rear or handle end thereof.

Figure 5 is a front end view of the leg rest.

Referring to the embodiment of the invention illustrated in the drawings, the numeral 10 generally designates a leg rest essentially comprising a support tube 11, a tube holder 12 and a clamp 13 for securing the leg rest to the instrument panel 14 of a motor vehicle. Figure 1 shows the leg rest attached to the instrument panel or dashboard of an automobile having a fire wall 15, floor board 16 and front seat cushion 17. Preferably, the elements of the rest are formed of steel although other materials having suitable properties of strength and durability may be utilized.

The horizontally slidable support member 11 consists of a tube having uniform diameter and having a knob or handle 18 secured to its rear exposed end. In the illustration given, the knob 18 is provided with a cylindrical portion 19 snugly received within the tube's end portion and secured therein by a pin 20.

Holder 12 comprises a relatively short tube having greater diameter than the support member for slidably receiving that member. An arcuate leaf spring 21 is riveted or otherwise secured at one end to the exterior of the tube holder and projects through a longitudinal opening 22 to bear against the outer surface of the elongated support tube 11. The frictional contact between this spring and the support tube or member assists in maintaining the slidable tube 11 in any selected position ranging between the fully extended position illustrated in Figure 1 and the fully retracted position represented by broken lines in that figure. The front end of the support tube is provided with outwardly projecting tabs 23 which are engageable with the front end of the holder and thereby serve as stops for limiting extension of the tube.

As shown most clearly in Figures 2, 3 and 5, the clamp 13 has a generally U-shaped configuration and is provided on each side with a continuous flange 24. The side flanges extend along spaced vertical planes and are apertured near the junction of the base portion and one of the leg portions of the clamp to receive a transversely-extending pin 25 which pivotally connects the clamp to the tube holder. The pin extends through the openings in a pair of transversely-aligned upstanding ears 26 which preferably are formed integrally with the tubular holder 12. Longitudinally spaced from one of the ears 26 is another ear 27 which receives a screw or rivet 28 for pivotally supporting one end of a slotted link 29. A bolt 30 equipped with a ring nut 31 extends through the slotted link and one of the flanges of the clamp at a spaced distance from the pivotal connection of the clamp and holder for anchoring the respective members in different selected angular positions.

Adjacent the free end of one of its parallel legs, the U-shaped clamp 13 is provided with a pair of threaded clamping screws 32. As indicated in Figure 1, the entire assembly may thus be securely attached to the instrument panel of an automobile by simply placing the lower edge portion of that panel between the legs of the clamp and then rotating screws 32 so that they tightly engage the panel and clamp the leg rest in place.

It has been found that tube 11 furnishes the most suitable lateral support for the right leg of a driver when it is horizontally disposed at the elevation of, or slightly below, the driver's knee. To insure horizontal orientation of the tubular support in automobiles having instrument panels with lower portions of varying downward and rearward inclination, angular adjustment may be made between the holder 12 and clamp 13. Therefore, after the clamp 13 has been secured to an automobile's instrument panel, tube 11 and holder 12 are pivoted with reference to the clamp until the tube lies along a horizontal line. Wing nut 31 is then tightened to lock the holder in its selected position.

When a driver desires to use the support for reducing leg strain, whether in the city or on long cross-country trips, he simply grips the knob 18 below the dash panel and pulls the support tube rearwardly into the extended position illustrated in Figure 1. The right leg used for operating the accelerator pedal is then rested against this lateral support to prevent muscle tension which would otherwise be caused by maintaining the lower part of the leg in upright condition for long periods of time. If desired, the smooth outer surface of the tube's rear end portion may be covered with a resilient material such as sponge rubber, although it has been found that the absence of such cushioning produces no discomfort even during long periods of use. When lateral support for the leg is not desired or is unnecessary because of the short duration of the trip, the tubular support 11 may be retracted by shoving it forward into the position indicated by broken lines in Figure 1.

Since the leg rest is extended and retracted by rearward and forward sliding movement of the tubular member 11, it is believed evident that the tube may be easily positioned by a driver without requiring him to shift or change in his seated position. In fact, it has been found that the leg rest may be easily extended and retracted by a driver while the car is in motion and without the driver taking his eyes off the road once he has learned the position of the device and its manner of operation.

Another important aspect of the invention lies in the fact that when the slidable tube is retracted the assembly is almost completely concealed beneath the dash panel except for the exposed handle or knob 18. Since there is no connection to the automobile's floor board, the leg rest does not interfere with foot movement of either the driver or the front seat passengers. Furthermore, the concealed nature of the leg rest assembly when the tube is retracted, as well as the longitudinal slidability of the tube even when it is extended, contribute greatly towards providing an effective leg rest for the driver which does not impair his own safety or that of his passengers should a collision occur.

While in the foregoing we have disclosed one embodiment of the present invention in considerable detail, it will be understood by those skilled in the art that many of these details may be varied widely without departing from the spirit and scope of the invention.

We claim:

1. A leg rest for laterally supporting the leg of a motor vehicle driver comprising a straight, elongated and horizontally extending leg support tube of substantially uniform diameter, a holder slidably receiving said tube for horizontal sliding movement therein, and clamping means for securely anchoring said holder upon the instrument panel of a motor vehicle, said tube being horizontally slidable through said holder between a retracted position beneath said panel and an extended position projecting rearwardly therefrom.

2. The structure of claim 1 in which said clamping means is pivotally connected to said holder for adjustably securing said leg support tube in horizontal position.

3. The structure of claim 1 in which said horizontal leg support tube is equipped with a handle secured to one end thereof for slidably moving the same between retracted and extended positions.

4. The structure of claim 1 in which said holder is equipped with spring means bearing against said slidable leg support tube for frictionally holding said tube in a selected position with reference to said holder.

5. A leg rest for laterally supporting the accelerator-operating leg of a vehicle operator comprising a straight horizontal tube, a holder slidably and telescopingly receiving said tube for horizontal extension and retraction of the same, and mounting means secured to said holder for mounting said holder and tube upon the instrument panel of a vehicle, said tube being horizontally slidable within said holder between a retracted position substantially concealed beneath said panel and an extended position projecting rearwardly from said panel when said leg rest is affixed thereto by said mounting means.

6. The structure of claim 5 in which said mounting means comprises a clamp secured to said holder and equipped with at least one clamping screw for tightly engaging a vehicle instrument panel.

7. The structure of claim 6 in which said clamp is pivotally secured to said holder for pivotal adjustment of the holder and tube into horizontal positions.

8. The structure of claim 7 in which locking means extend between said holder and clamp for restraining pivotal movement when said tube and holder are horizontally disposed.

References Cited in the file of this patent

UNITED STATES PATENTS

| | | |
|---|---|---|
| 1,986,555 | Carlson | Jan. 1, 1935 |
| 2,133,443 | Girl | Oct. 18, 1938 |
| 2,328,991 | Murdaugh | Sept. 7, 1943 |
| 2,701,605 | Belmont | Feb. 8, 1955 |